US010163013B2

(12) United States Patent
Fujimori

(10) Patent No.: US 10,163,013 B2
(45) Date of Patent: Dec. 25, 2018

(54) PHOTOGRAPHIC IMAGE EXTRACTION APPARATUS, PHOTOGRAPHIC IMAGE EXTRACTION METHOD, AND PROGRAM

(71) Applicant: Seiko Epson Corporation, Tokyo (JP)

(72) Inventor: Yukimitsu Fujimori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 9 days.

(21) Appl. No.: 15/335,752

(22) Filed: Oct. 27, 2016

(65) Prior Publication Data

US 2017/0124397 A1 May 4, 2017

(30) Foreign Application Priority Data

Nov. 4, 2015 (JP) .................. 2015-216382

(51) Int. Cl.
*G06K 9/00* (2006.01)
*H04N 1/00* (2006.01)
*H04N 1/32* (2006.01)

(52) U.S. Cl.
CPC ..... *G06K 9/00677* (2013.01); *H04N 1/00135* (2013.01); *H04N 1/00145* (2013.01); *H04N 1/00148* (2013.01); *H04N 1/00164* (2013.01); *H04N 1/32133* (2013.01); *H04N 1/32149* (2013.01); *H04N 2201/3269* (2013.01); *H04N 2201/3271* (2013.01)

(58) Field of Classification Search
None
See application file for complete search history.

(56) References Cited

U.S. PATENT DOCUMENTS

| 6,738,154 | B1* | 5/2004 | Venable | G06K 9/32 |
| | | | | 358/1.15 |
| 2001/0019416 | A1* | 9/2001 | Monty | H04N 1/00132 |
| | | | | 358/1.9 |
| 2001/0052993 | A1* | 12/2001 | Lumley | H04N 1/00968 |
| | | | | 358/1.12 |
| 2002/0051201 | A1* | 5/2002 | Winter | H04N 1/00132 |
| | | | | 358/1.16 |
| 2002/0172419 | A1* | 11/2002 | Lin | G06K 9/0061 |
| | | | | 382/167 |
| 2003/0020945 | A1* | 1/2003 | Lopez | G06F 17/30899 |
| | | | | 358/1.15 |

(Continued)

FOREIGN PATENT DOCUMENTS

JP 2001-357067 A 12/2001
JP 2007-052646 A 3/2007

(Continued)

*Primary Examiner* — Ryan P Potts
(74) *Attorney, Agent, or Firm* — Workman Nydegger

(57) ABSTRACT

A photographic image extraction apparatus according to the invention is applied to a smartphone. The smartphone includes an image capture unit that captures images of a plurality of photographs, a photographic image extraction unit that analyzes a plurality of photographic images that are the captured images of the plurality of photographs and extracts, from the plurality of photographic images, one or more photographic images having a high likelihood of containing an image of a specific person, and an extraction result display unit that displays a result of extraction by the photographic image extraction unit.

12 Claims, 10 Drawing Sheets

(56) References Cited

U.S. PATENT DOCUMENTS

| | | | | |
|---|---|---|---|---|
| 2003/0063295 | A1* | 4/2003 | Kinjo | G03D 15/001 |
| | | | | 358/1.1 |
| 2004/0151399 | A1* | 8/2004 | Skurdal | G06T 11/60 |
| | | | | 382/266 |
| 2005/0185204 | A1* | 8/2005 | Shelton | H04N 1/00132 |
| | | | | 358/1.13 |
| 2007/0046997 | A1* | 3/2007 | Nakagawa | G06Q 10/087 |
| | | | | 358/1.18 |
| 2007/0053571 | A1 | 3/2007 | Hayashi | |
| 2007/0091376 | A1* | 4/2007 | Calhoon | G06T 1/0021 |
| | | | | 358/3.28 |
| 2010/0299621 | A1* | 11/2010 | Piehler | H04N 1/00795 |
| | | | | 715/764 |
| 2012/0075491 | A1* | 3/2012 | Hoarau | G06F 3/1204 |
| | | | | 348/222.1 |

FOREIGN PATENT DOCUMENTS

| | | |
|---|---|---|
| JP | 2007-156513 A | 6/2007 |
| JP | 2013-161394 A | 8/2013 |

* cited by examiner

FIG. 3

| POSITION OF PHOTOGRAPH | IDENTIFICATION INFORMATION (ORDER NUMBER) |
|---|---|
| 1st COLUMN - 1st ROW | ******** |
| 1st COLUMN - 2nd ROW | ******** |
| 1st COLUMN - 3rd ROW | ******** |
| 1st COLUMN - 4th ROW | ******** |
| 2nd COLUMN - 1st ROW | ******** |
| 2nd COLUMN - 2nd ROW | ******** |
| 2nd COLUMN - 3rd ROW | ******** |
| 2nd COLUMN - 4th ROW | ******** |
| 3rd COLUMN - 1st ROW | ... |

PHOTOGRAPHIC IMAGE EXTRACTION APPARATUS, PHOTOGRAPHIC IMAGE EXTRACTION METHOD, AND PROGRAM

BACKGROUND

1. Technical Field

The present invention relates to a photographic image extraction apparatus, a photographic image extraction method, and a program for extracting, from a plurality of photographic images, a photographic image having a high likelihood of containing an image of a specific person.

2. Related Art

As an example of such a technique, JP-A-2013-161394 has been known. JP-A-2013-161394 discloses a photograph ordering system that accesses a server via the Internet from an information processing device, such as a tablet device, to order a desired photograph. In this photograph ordering system, a user registers a specific person in advance, and from a plurality of photographs obtained from the server, a photograph containing an image of the specific person is extracted and displayed on a device of the user. In this way, with the use of the Internet, a user can order a desired photograph at any convenient time and place.

In an Internet-based photograph ordering system, such as that described in JP-A-2013-161394, however, there is a possibility that registered information about a specific person may leak on the Internet.

In the meantime, there is a known photograph ordering method which includes selecting a desired photograph from among a plurality of photographs posted on a wall or the like and filling out an order number on an order envelope or the like to order the desired photograph. This method allows even a person who is unfamiliar with operating a personal computer (PC) or a tablet device to order a photograph easily. It is also easy for a photography agent or an event organizer to show photographs to a user (a client). Thus, this method is still often used today. With this method, however, it takes time to find a desired photograph when many photographs are posted, and there are cases where it is difficult to allocate enough time to look at the photographs if another person also wishes to look at the posted photographs.

SUMMARY

An advantage of some aspects of the invention is that it is possible to provide a photographic image extraction apparatus, a photographic image extraction method, and a program which allow a desired photograph to be found quickly from among a large number of photographs posted on a wall or the like without using a network such as the Internet.

A photographic image extraction apparatus according to an aspect of the invention includes: an image capture unit that captures images of a plurality of photographs; a photographic image extraction unit that analyzes a plurality of photographic images that are the captured images of the plurality of photographs and extracts, from the plurality of photographic images, one or more photographic images having a high likelihood of containing an image of a specific person; and an extraction result display unit that displays a result of extraction by the photographic image extraction unit.

A photographic image extraction method according to an aspect of the invention is the method including causing a computer to execute: capturing images of a plurality of photographs; analyzing a plurality of photographic images that are the captured images of the plurality of photographs and extracting, from the plurality of photographic images, one or more photographic images having a high likelihood of containing an image of a specific person; and displaying a result of the extracting.

With the configuration according to the aspects of the invention, one or more photographic images having a high likelihood of containing an image of a specific person are extracted from a plurality of photographic images captured by the image capture unit, and the result of the extraction is displayed. This allows a desired photograph to be found quickly even from among photographs posted on a wall or the like. Furthermore, it is possible to browse the photographic images offline without being connected to the Internet, and thus, there is no security risk such as leakage of information about a specific person.

The photographic image extraction apparatus further includes: an identification information obtaining unit that obtains identification information for uniquely identifying each of the one or more photographic images extracted by the photographic image extraction unit; an input unit that selects a photographic image that is to be ordered; and an ordering unit that orders a photograph of the photographic image selected by the input unit. The ordering unit orders the photograph of the photographic image by using the identification information.

With the configuration, a photograph can be ordered by using the photographic image extraction apparatus, that is, it is not necessary to refer to the result of the extraction by the photographic image extraction apparatus or use an order envelope or the like to order a photograph, nor is it necessary to use another device to perform an ordering operation. Thus, it is possible to order the photograph of a desired photographic image quickly and easily.

In the photographic image extraction apparatus, the identification information obtaining unit obtains the identification information with reference to a lookup table associating a position of each of the plurality of photographs with the identification information of the photograph.

With the configuration, a photograph provider needs to provide only the lookup table to a user; when posting photographs, the photograph provider can be spared the burden of posting the identification information in association with each of the photographs.

In the photographic image extraction apparatus, a digital watermark is embedded in each of the plurality of photographs, and the identification information obtaining unit obtains the identification information from the digital watermark when the image capture unit captures an image.

With the configuration, a user can obtain photographic images and identification information simultaneously by only capturing images of photographs. Furthermore, since the identification information is embedded as the digital watermark in each photograph, a desired photograph can easily be identified.

In the photographic image extraction apparatus, the image capture unit captures video, and the photographic image extraction unit extracts the one or more photographic images from the plurality of photographic images that are included in the video.

With the configuration, images of a plurality of photographs are captured as video, and thus it is possible to obtain a large number of photographic images quickly compared with the case where still images are captured in two or more operations.

In the photographic image extraction apparatus, the extraction result display unit displays, among the plurality of photographic images captured by the image capture unit, the one or more photographic images extracted by the photographic image extraction unit in such a way to stand out more than other photographic images as a result of the extraction.

With the configuration, a user can check the one or more photographic images displayed in an emphasis mode while checking the photographic images, of all the photographs, captured by the image capture unit. This makes it possible to not only find a desired photograph quickly, but also check, for example, photographs not extracted due to an issue of extraction accuracy despite containing an image of a specific person and a photograph desired to be obtained despite not containing an image of a specific person.

In the photographic image extraction apparatus, the extraction result display unit displays the specific person in such a way to stand out more than other persons whose images are present in the one or more photographic images extracted by the photographic image extraction unit.

With the configuration, a specific person is displayed in an emphasis mode, and thus a user can easily check whether the result of the extraction is correct.

The photographic image extraction apparatus further includes: photographic image storage that stores photographic images captured in the past; and a specific person identifying unit that identifies, as the specific person, a person whose image is present in a large number of photographic images among the photographic images stored in the photographic image storage.

With the configuration, it is possible to spare a user the burden of designating a specific person.

Note that in the case where the photographic image extraction apparatus is implemented as a smartphone, a photo database can be used as the "photographic image storage". There is a high possibility that this photo database includes photographs containing an image of a subject whose photograph is desired to be obtained, such as a user or a family member or friend of the user. In other words, with the configuration, it is possible to efficiently identify a specific person while using an existing function.

The photographic image extraction apparatus further includes: personal information storage that stores a portrait in association with personal information; and a specific person identifying unit that identifies the specific person on the basis of the personal information stored in the personal information storage. The photographic image extraction unit extracts the one or more photographic images by using the portrait of the identified specific person.

With the configuration, it is possible to spare a user the burden of designating a specific person.

Note that in the case where the photographic image extraction apparatus is implemented as a smartphone, a "contact information list" or an "address book" can be used as the "personal information storage". There is a high possibility that information indicating the relationship with a user (including a display name such as "father" or "son" and classification such as "family member" or "friend") is stored as personal information in the contact information list and the address book. In other words, with the configuration, it is possible to efficiently identify a specific person while using an existing function.

The photographic image extraction apparatus further includes a related person identifying unit that analyzes the plurality of photographic images captured by the image capture unit and identifies a related person whose image is present in a photograph containing an image of the specific person. The photographic image extraction unit extracts a photographic image having a high likelihood of containing an image of at least one of the specific person and the related person.

With the configuration, the subject to be extracted from the photographic images can be not only a specific person, but also a related person whose image is present in a photograph containing an image of the specific person.

In the photographic image extraction apparatus, the extraction result display unit displays the specific person and the related person to be distinguishable.

With the configuration, a user can easily check, for example, which person is identified as the related person and whether the result of identifying the specific person and the related person is correct.

A program according to an aspect of the invention causes a computer to execute processing included in the photographic image extraction method.

The use of this program makes it possible to provide a photographic image extraction method which allows a desired photograph to be found quickly from among a large number of photographs posted on a wall or the like without using a network such as the Internet.

BRIEF DESCRIPTION OF THE DRAWINGS

The invention will be described with reference to the accompanying drawings, wherein like numbers reference like elements.

FIG. 3 illustrates an example of a lookup table.

DESCRIPTION OF EXEMPLARY EMBODIMENTS

Hereinafter, a photographic image extraction apparatus, a photographic image extraction method, and a program according to the invention will be described in detail with reference to the drawings. In the present embodiment, the photographic image extraction apparatus according to the invention is applied to a smartphone as an example.

Figure 1:
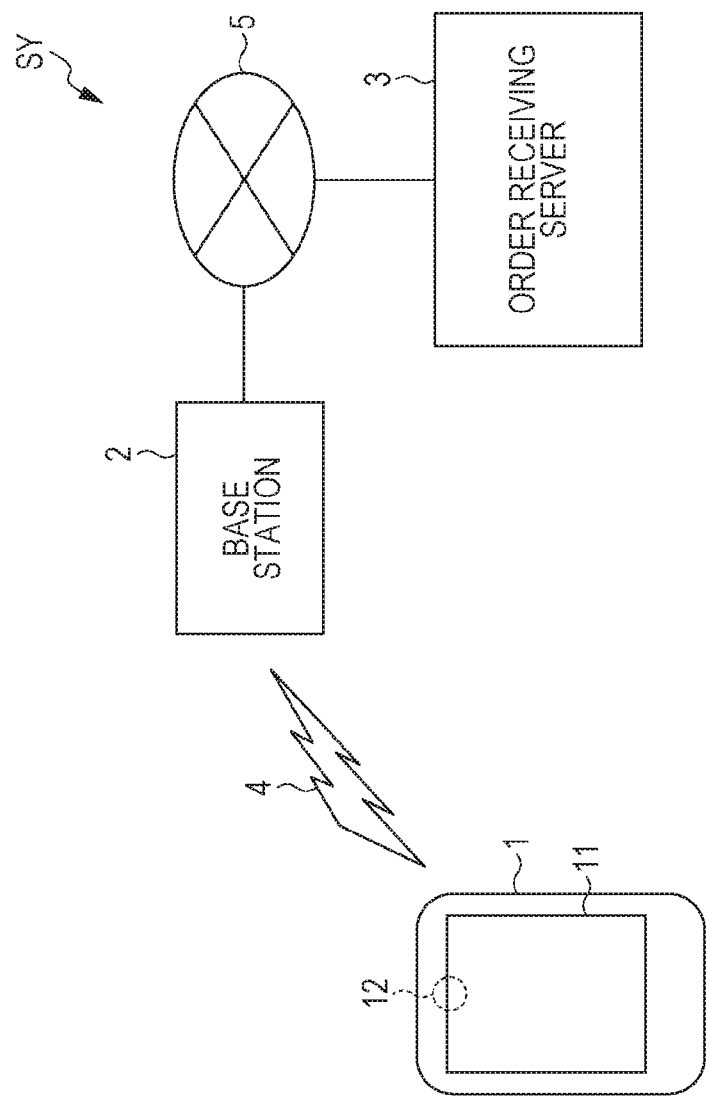
FIG. 1 is a system configuration diagram of a photograph ordering system.

FIG. 1 is a system configuration diagram of a photograph ordering system SY according to an embodiment of the invention. The photograph ordering system SY includes a smartphone 1 (a photographic image extraction apparatus) that captures an image of a photograph and an order receiving server 3 that receives an order of a photograph. The smartphone 1 is connected to the base station 2 via wireless communication 4. The base station 2 is connected to the order receiving server 3 via a network 5 such as the Internet. The smartphone 1 has common elements including a touch panel 11 and a camera 12.

Figure 2:
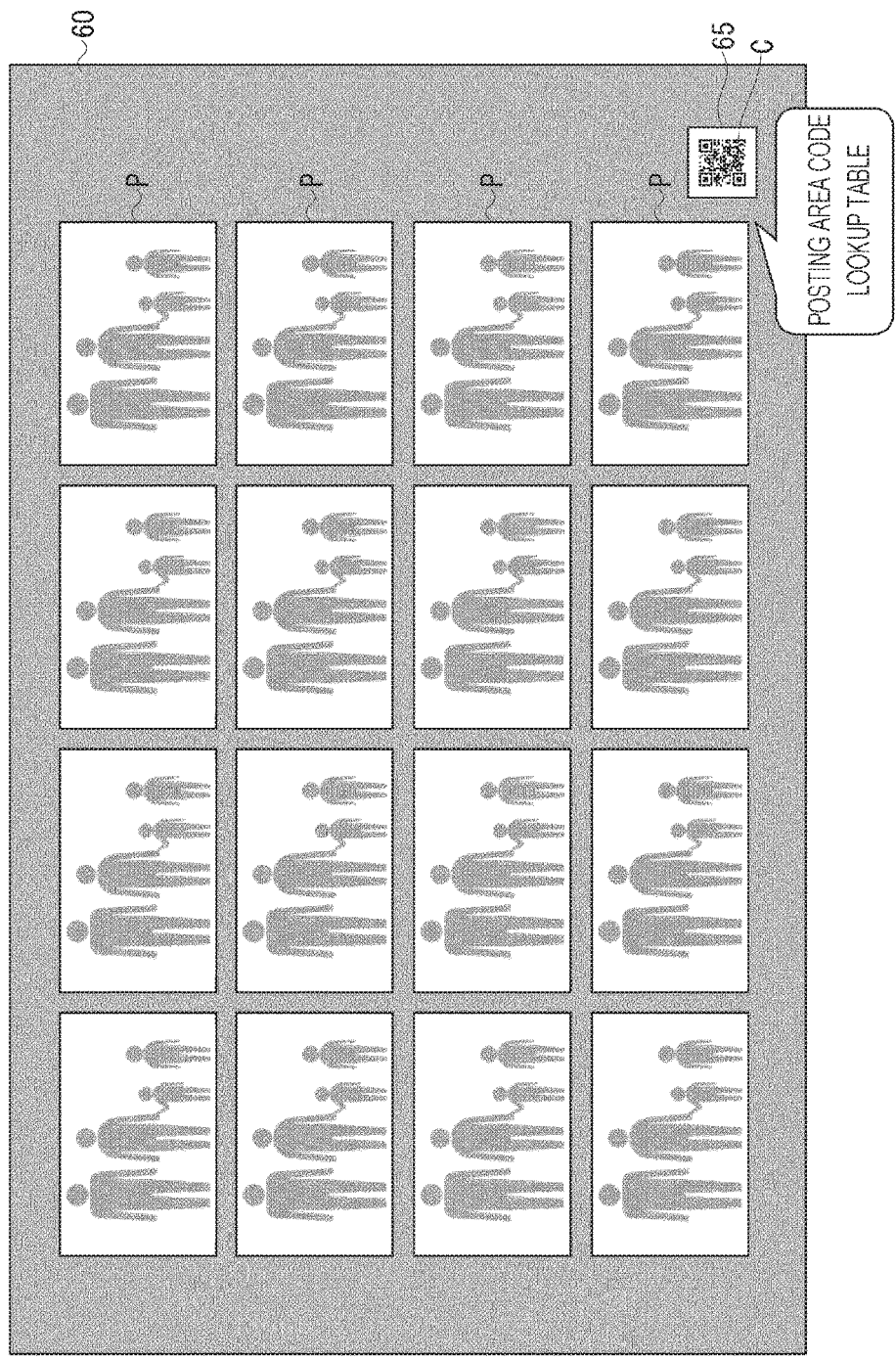
FIG. 2 illustrates an example of photographs being posted.

FIG. 2 illustrates an example of photographs being posted. In FIG. 2, a large number of photographs captured at an event or the like are posted in a posting area 60 such as a wall surface. In FIG. 2, P denotes a photograph (a developed photograph). Although all of the images denoting photographs in FIG. 2 are the same, in reality, each image is different. Furthermore, characters such as "SAMPLE" may be printed over the photographs. Moreover, the photographs may be posted in a state of being stored in photo folders.

A label 65 with a two-dimensional code C printed thereon is attached to a part of the posting area 60. The smartphone 1 captures an image of the two-dimensional code C when capturing images of the photographs. A posting area code and a lookup table, which provide information necessary for ordering a photograph, are stored in the two-dimensional code C. The posting area code is information for identifying the posting area 60. The lookup table is a table associating the position of each photograph (the arrangements of the photographs) among the photographs posted in the posting area 60 with identification information for identifying the photograph. FIG. 3 illustrates an example of the lookup table. In the case where photographs are posted in two or more columns and two or more rows as illustrated in FIG. 2, information indicating where each photograph is located in sequential order of the rows and the columns as illustrated in FIG. 3 is stored. The order number of each photograph is stored as the identification information.

Figure 4:
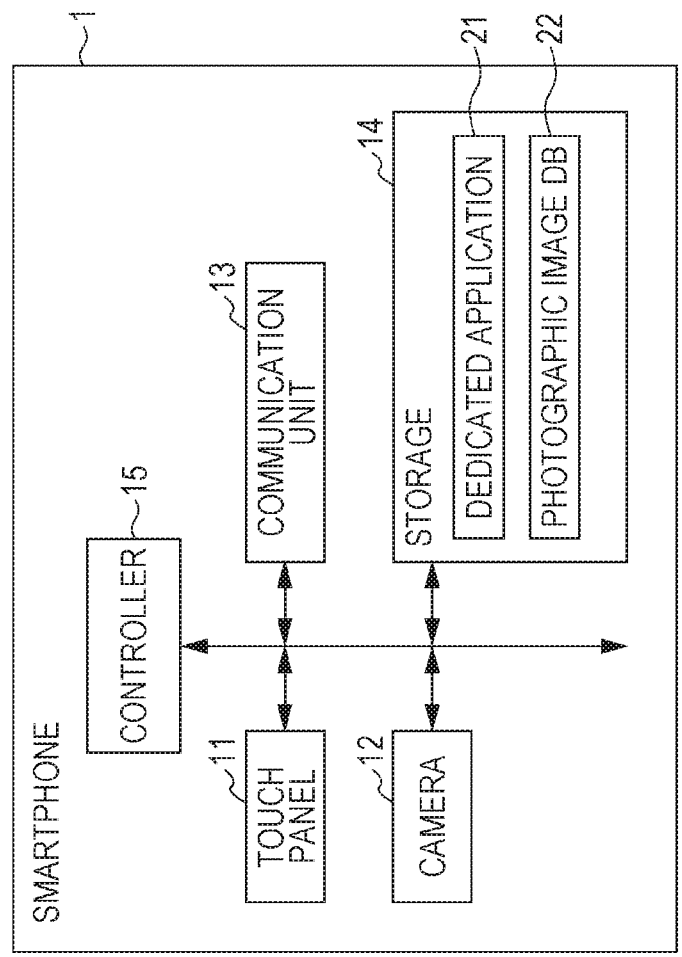
FIG. 4 is a control block diagram of a smartphone.

Next, a hardware configuration of the smartphone 1 will be described with reference to FIG. 4. The smartphone 1 includes the touch panel 11, the camera 12, a communication unit 13, storage 14, and a controller 15.

The touch panel 11 is used for inputting and displaying information. The camera 12 captures images of the photographs. The communication unit 13 communicates with the order receiving server 3 via the base station 2. Note that in the case where the smartphone 1 has a function of allowing connection to the network 5 by using the communication unit 13 or another element, the smartphone 1 can connect to the network 5, not via the base station 2, and communicate with the order receiving server 3 via the network 5.

The storage 14 is non-volatile memory that stores various types of information, such as operating system (OS) information. In the present embodiment, the storage 14 stores a dedicated application 21 and a photographic image database (hereinafter referred to as a "photographic image DB 22"). The dedicated application 21 is an application for smartphones that extracts, from captured photographic images, one or more photographic images having a high likelihood of containing an image of a specific person, such as the owner of the smartphone 1 or a family member of the owner, presents the result of extraction to a user, and allows the user to order a photograph. The photographic image DB 22 is a database for photographs. Photographic images captured by the smartphone 1 in the past and photographic images obtained from external sources are stored in the photographic image DB 22 together with additional information such as dates of capture and location information.

The controller 15 is implemented as a central processing unit (CPU), a random access memory (RAM), and the like, and controls the touch panel 11, the camera 12, the communication unit 13, and the storage 14. In the present embodiment, control of extraction of a photographic image and control of communication with the order receiving server 3 are performed mainly in accordance with the dedicated application 21.

Next, functional elements of the smartphone 1 and the order receiving server 3 will be described with reference to FIG. 5. The smartphone 1 includes, as functional elements, photographic image storage 110, an image capture unit 120, an identification information obtaining unit 130, a specific person identifying unit 140, a photographic image extraction unit 150, an extraction result display unit 160, an input unit 170, and an ordering unit 180. The order receiving server 3 includes an order receiving unit 310 as a functional element.

The photographic image storage 110 corresponds to the photographic image DB 22 and stores a large number of photographic images captured in the past. Note that the photographic images may either be images captured by the smartphone 1 or images captured by an image capture device other than the smartphone 1.

Figure 6:
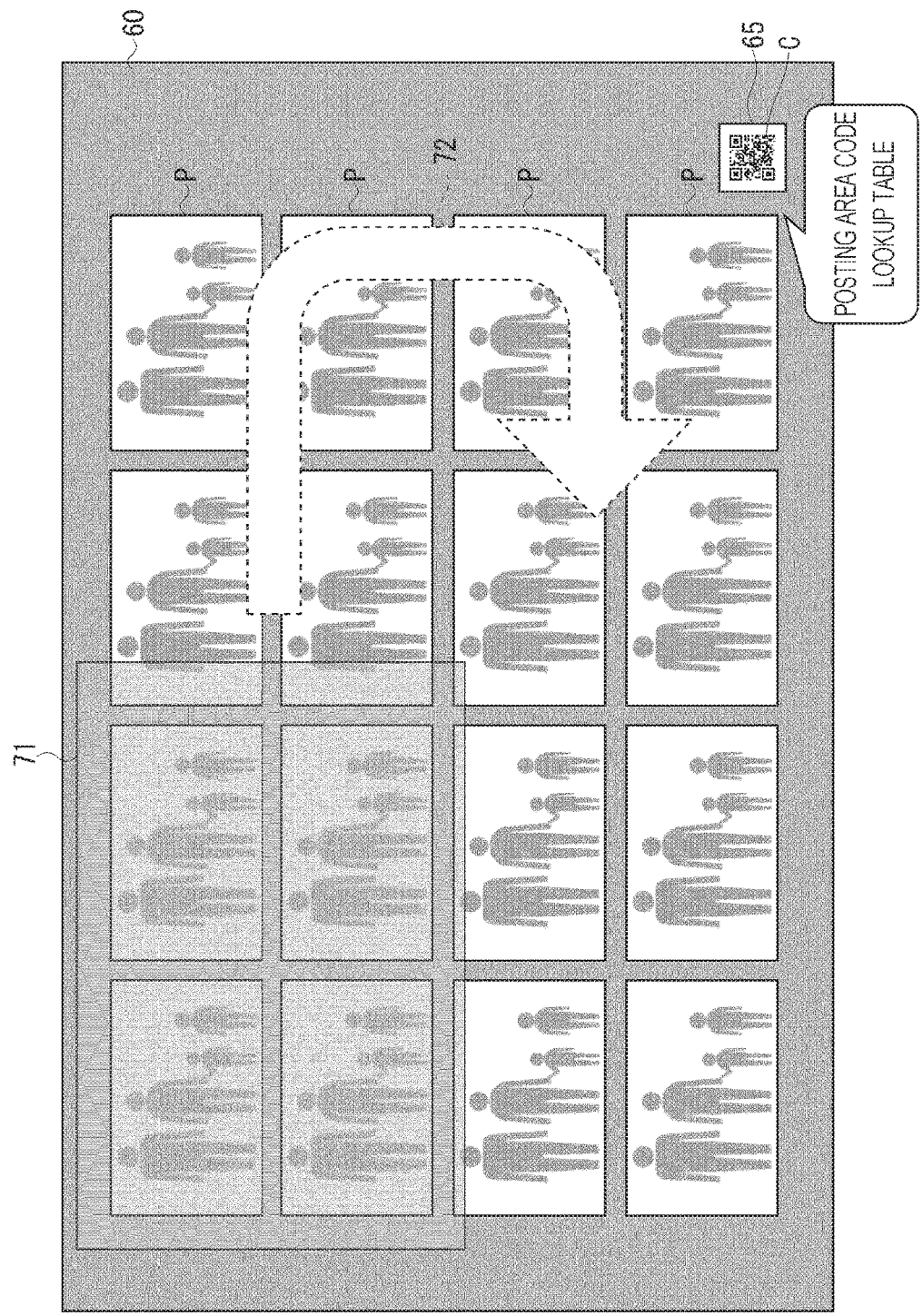
FIG. 6 illustrates an example of a method of capturing images of photographs as video.

By using the camera 12, the image capture unit 120 captures images of the photographs posted in the posting area 60 (capturing). The image capture unit 120 according to the present embodiment captures video. A method of capturing an image is described below with reference to FIG. 6. In FIG. 6, 71 denotes a range of image capture by the image capture unit 120, and 72 denotes a direction in which the range of image capture moves. As illustrated in FIG. 6, a user captures the photographs that are to be posted in the posting area 60 while moving the range of image capture. This image capture includes capturing an image of the label 65 with the two-dimensional code C printed thereon. Note that the direction in which the range of image capture moves is not limited to the direction illustrated in FIG. 6; for example, a method of capturing images of all over the posting area 60 while causing the range of image capture to reciprocate in the column direction is applicable.

Figure 5:
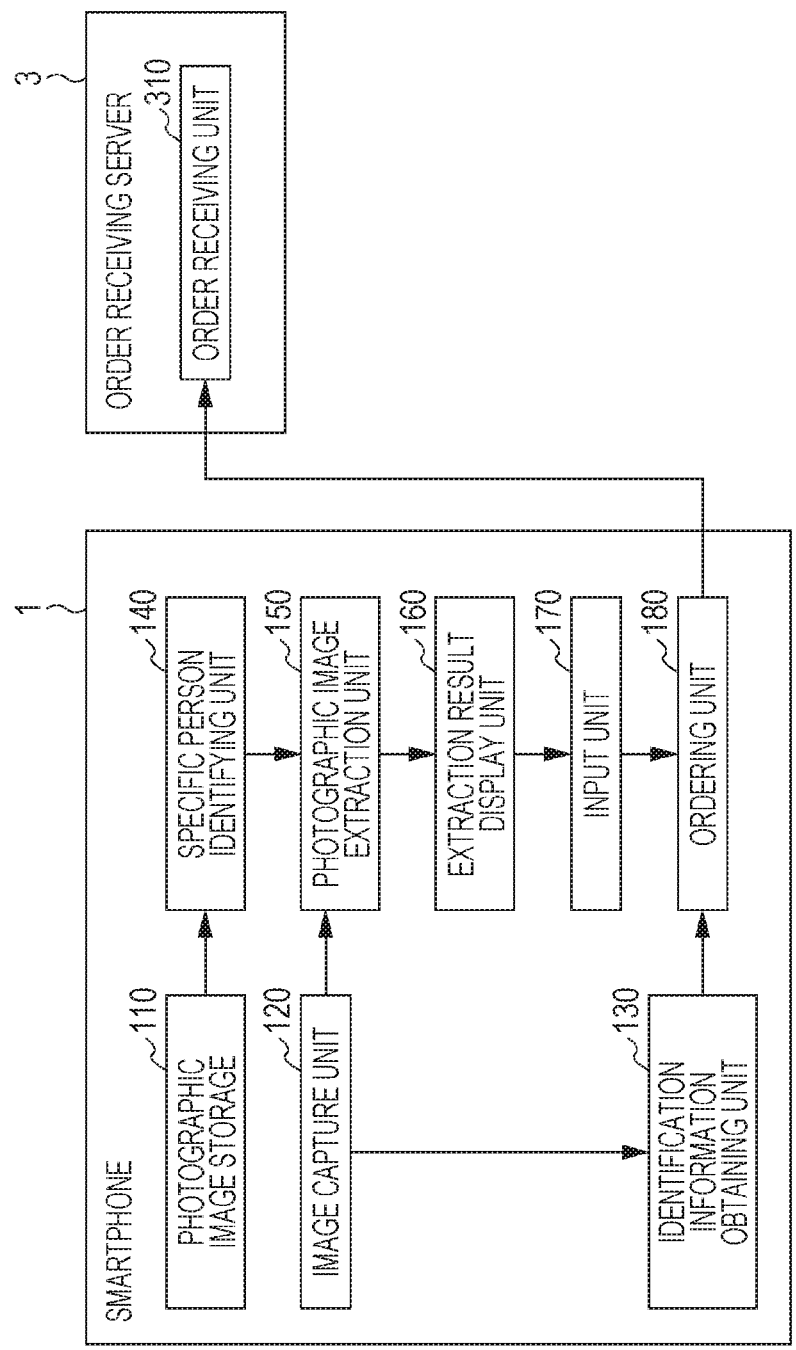
FIG. 5 is a functional block diagram of a smartphone.

The description returns to FIG. 5. The identification information obtaining unit 130 obtains identification information for uniquely identifying each photographic image extracted by the photographic image extraction unit 150, to be described later. In the present embodiment, the identification information is obtained with reference to the lookup table illustrated in FIG. 3. Specifically, the identification information obtaining unit 130 analyzes the result of the image capture by the image capture unit 120 to determine where each photograph is located in sequential order of the rows and the columns and reads from the lookup table the identification information corresponding to the result of the determination.

The specific person identifying unit 140 identifies, as a specific person, a person whose image is present in a large number of photographic images among the photographic images stored in the photographic image storage 110. As an identification method, an existing facial recognition technology (the feature extraction and comparison method, the template matching method, or the like) is used. For example, it is conceivable that several popular people whose images are present in a large number of photographic images are each regarded as a specific person or that a person whose image is present in at least a predetermined number of photographs is regarded as a specific person. Note that the additional information added to the photographs may be used in such a manner that a user designates a date, a location, or the like, to identify, as a specific person, a person the image of which was captured on the date or at the location. It is also possible to regard, as a specific person, a person whose image is present in a specific photographic image designated by a user among photographic images loaded on the smartphone 1 used to capture images of the photographs posted in the posting area 60.

The photographic image extraction unit 150 analyzes the result of the image capture by the image capture unit 120 and extracts a photographic image having a high likelihood of containing an image of the specific person identified by the specific person identifying unit 140 (analyzing and extracting). An existing facial recognition technology is used in this extraction method as well. One or more photographic images may be extracted with reference to arbitrary information input by a user, such as the gender, age, height, or weight of the specific person. The extraction of a photographic image may happen after the video captured by the image capture unit 120 is stored or may happen during the video capture by the image capture unit 120, in other words, in real-time.

The extraction result display unit 160 displays, on the touch panel 11, the result of the extraction by the photographic image extraction unit 150 (displaying). In the present embodiment, among the plurality of photographic images obtained as a result of the image capture by the image capture unit 120, one or more photographic images extracted by the photographic image extraction unit 150 are displayed in such a way to stand out more than the other photographic images as a result of the extraction.

Figure 7:
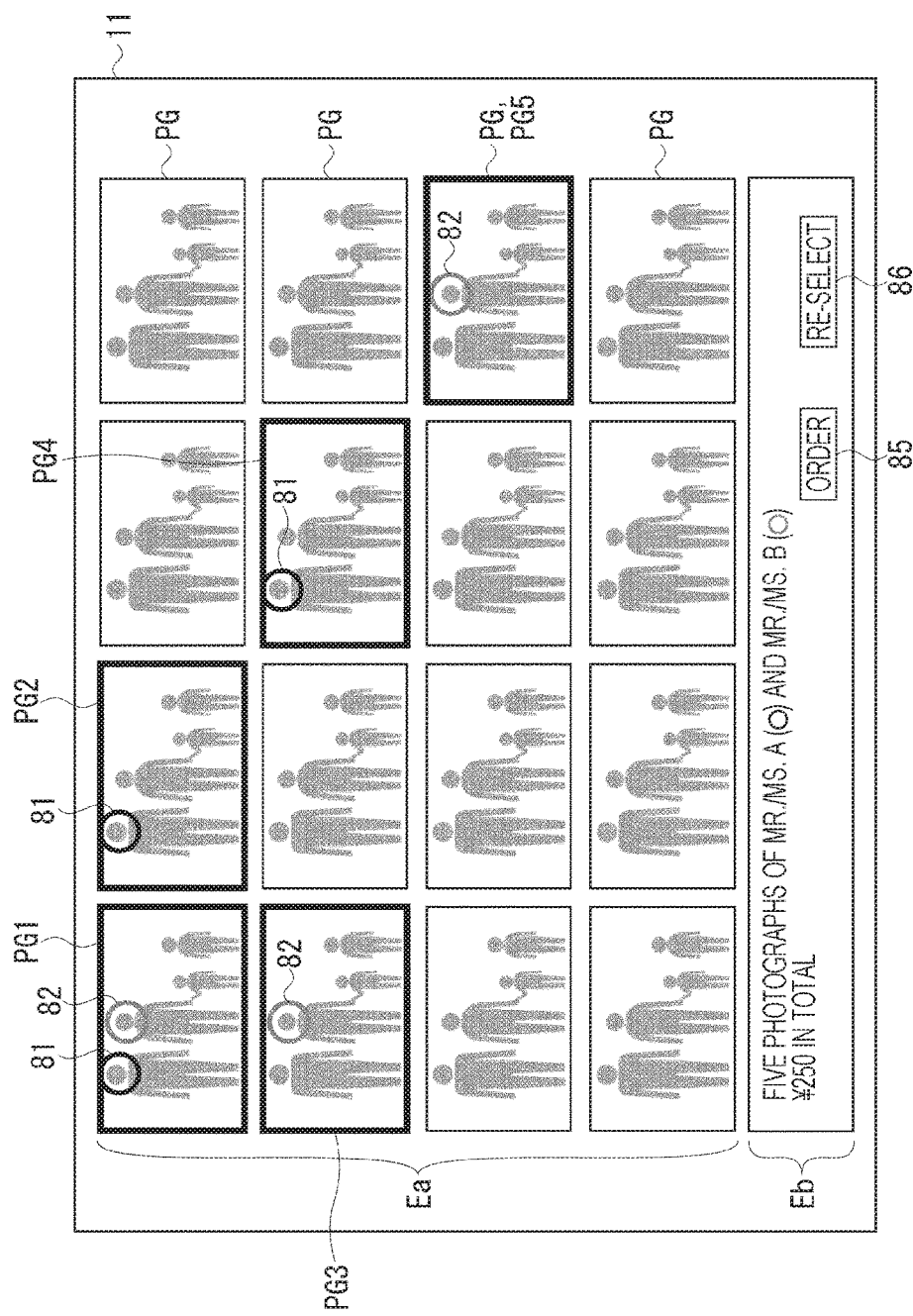
FIG. 7 illustrates an example of the result of photographic image extraction being displayed.

FIG. 7 illustrates an example of the result of photographic image extraction being displayed. In FIG. 7, Ea and Eb denote a photographic image display region and an input region, respectively, and PG denotes a photographic image (a captured image of the posted photograph). Each photographic image is obtained by clipping, on the basis of region determination performed on the photographs, a photograph region from the result of the image capture by the image capture unit 120, and performing a well-known process of image correction, such as correction of trapezoidal distortion or contrast adjustment, on an image within the photograph region.

In FIG. 7, PG1 to PG5 denote the extracted photographic images, and 81 denotes an emphasis mark for a specific person "A" while 82 denotes an emphasis mark for a specific person "B". With this, among the captured photographic images, one or more photographic images, namely, PG1 to PG5, extracted by the photographic image extraction unit 150 (the photographic images including the emphasis mark denoted by 81 or 82) are displayed in the photographic image display region Ea in such a way to stand out more than the other photographic images. Although the photographic images are emphasized with thick frames in FIG. 7, it is also possible to use other methods such as changing the color of a photograph frame and highlighting. The extraction result display unit 160 displays different specific persons with emphasis marks in different display styles (for examples, with marks of different color, shape, or line type). In addition, touching the touch panel 11 at the position of the photographic image PG displayed on the touch panel 11 enables switching between a selected mode where the photographic image PG is emphasized and a non-selected mode resulting from cancellation of the emphasis mode.

In the input region Eb, the number of selected photographs and the amount to be charged for the selected photographs are displayed together with an "ORDER" button 85 and a "RE-SELECT" button 86. Every time a user switches between the selected mode and the non-selected mode for the photographic image PG displayed on the touch panel 11, the number of photographs and the amount to be charged for the photographs which are displayed in the input region Eb change accordingly. When the "ORDER" button 85 is selected, the photographs that correspond to the emphasized photographic images PG1 to PG5 are ordered. When the "RE-SELECT" button 86 is selected, the emphasis mode of the photographic images PG1 to PG5 is cancelled, and a user is prompted to re-select a photographic image.

The description returns to FIG. 5. By a user operating the touch panel 11, the input unit 170 specifies a photographic image to be ordered. When the "ORDER" button 85 is selected, the photographic image PG displayed in an emphasis mode at the time is selected. When the "RE-SELECT" button 86 is selected, the arbitrarily selected input from a user is reset, and the display returns to the state of displaying the result of the extraction by the photographic image extraction unit 150, allowing a user to arbitrarily re-select a desired photographic image from among the displayed photographic images.

The ordering unit 180 orders the photograph corresponding to the photographic image selected by the input unit 170. At this time, the identification information (the order number) obtained by the identification information obtaining unit 130 is used for the ordering. Specifically, the order is placed by transmitting to the order receiving server 3 the identification information on each photographic image selected by the input unit 170. At this time, the posting area code read from the two-dimensional code C on the label 65 and user information registered in the dedicated application 21 (such as name, address, and payment information) are transmitted as well.

The order receiving unit 310 of the order receiving server 3 receives the order of the photograph by receiving the identification information, the posting area code, and the user information from the smartphone 1. Subsequently, the order receiving server 3 provides image data of the ordered photograph via the network 5. The method of providing a photograph may be mailing of a developed (or printed) photograph.

As described above, the smartphone 1 according to the present embodiment extracts one or more photographic images having a high likelihood of containing an image of a specific person from a plurality of photographic images captured by the image capture unit 120, and displays the result of the extraction on the touch panel 11. Therefore, the smartphone 1 according to the present embodiment is capable of finding a desired photograph quickly even when the desired photograph is among the photographs posted in the posting area 60. Furthermore, it is possible to browse and select the photographic images offline without being connected to the Internet and thus, there is no security risk such as leakage of information about a specific person. Moreover, there is a possibility that the server or the like makes the photographic images available to the public, then a user (a client) can download the publicly available photographic images to a device of the user, meaning that the image data can be obtained without ordering photographs. In this case, business opportunities of photograph providers (photography agents or event organizers) may be lost, but this problem of losing business opportunities can be avoided by showing a user the photographs posted in the posting area 60.

Furthermore, the image capture unit 120 according to the present embodiment can capture images of a plurality of photographs as video and thus obtain a large number of photographic images quickly compared with the case of capturing still images in two or more operations. The identification information obtaining unit 130 according to the present embodiment obtains the identification information for ordering a photograph from the lookup table, thus making it possible to spare a photograph provider the burden of posting the identification information in association with each photograph (for example, the burden of writing by hand or labeling order numbers on or around the photographs). It is also possible to obtain the two-dimensional code C when capturing images of photographs (as a part of a video), thus allowing a user to be spared the burden of obtaining the lookup table. Furthermore, in the present embodiment, it is possible to automatically identify a specific person, such as a user or a family member or friend of the user, through image analysis on the photographic images stored in the photographic image DB22, thus allowing a user to be spared the burden of designating the specific person.

Furthermore, the extraction result display unit 160 according to the present embodiment displays one or more photographic images extracted by the photographic image extraction unit 150 in such a way to stand out more than the other photographic images as a result of the extraction, and therefore a user can check the one or more photographic images displayed in an emphasis mode while checking all the photographic images of captured photographs. This makes it possible to not only find a desired photograph quickly, but also check, for example, photographs not extracted due to an issue of extraction accuracy despite containing an image of a specific person and a photograph desired to be obtained despite not containing an image of a specific person. In addition, since a specific person is displayed in an emphasis mode, a user can check whether the result of the extraction is correct (whether the result of the extraction certainly contains an image of a specific person).

Note that the following variations are applicable without depending on the foregoing embodiment.

Variation 1

Figure 8:
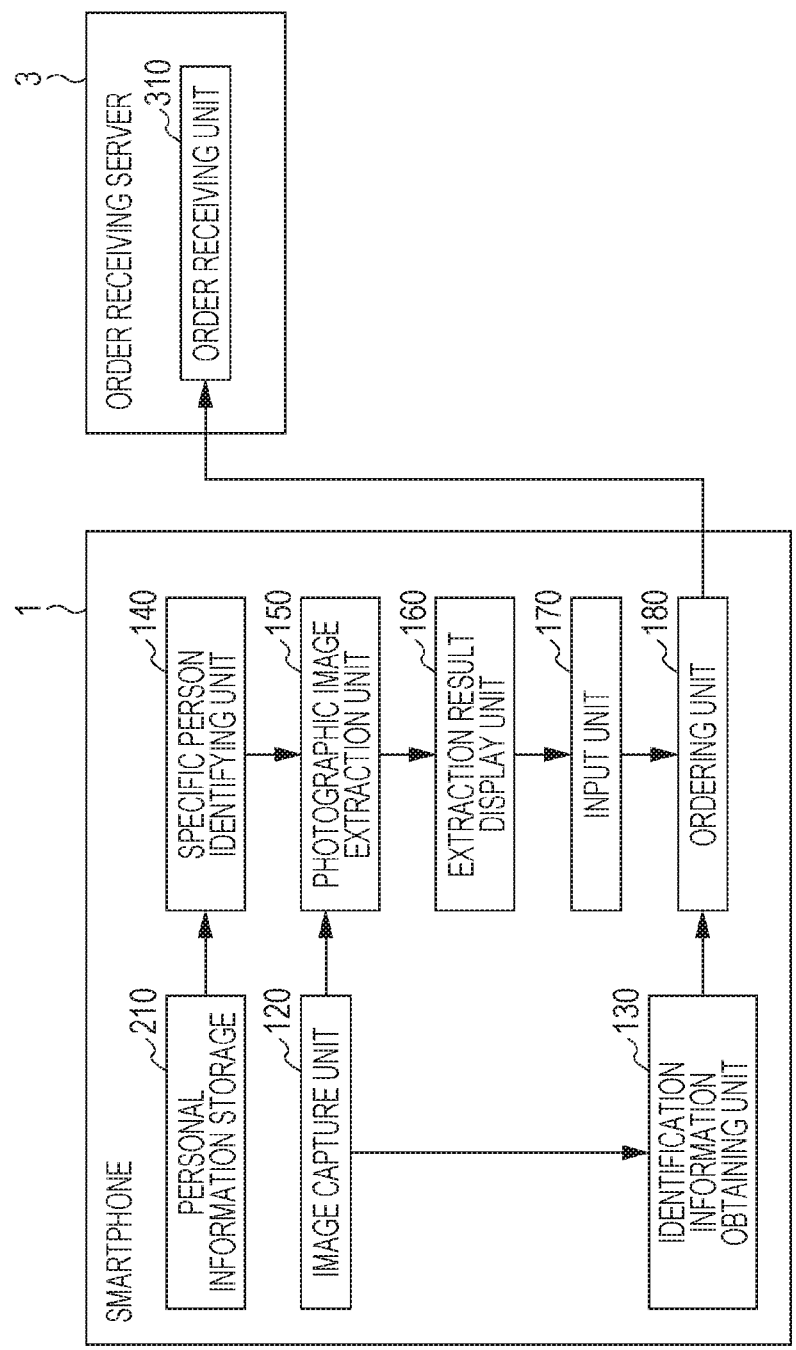
FIG. 8 is a functional block diagram of a smartphone according to Variation 1.

FIG. 8 is a functional block diagram of the smartphone 1 according to Variation 1. The smartphone 1 according to the present variation includes personal information storage 210 instead of the photographic image storage 110 (see FIG. 5) according to the foregoing embodiment. The personal information storage 210 stores a portrait in association with personal information and corresponds to a "contact information list" or an "address book" included in the smartphone 1 as a common function. Information indicating the relationship with a user (including a display name such as "father" or "son" and classification such as "family member" or "friend") is stored as personal information in this personal information storage 210. The specific person identifying unit 140 according to the present variation refers to the personal information and identifies, as a specific person, a person closely related to a user. Subsequently, the photographic image extraction unit 150 extracts one or more photographic images from the captured photographic images by using the portrait of the specific person stored in the personal information storage 210. In the present variation, personal names stored in the personal information storage 210 are indicated in the input region Eb as the names "Mr./Ms. A" and "Mr./Ms. B" (see FIG. 7).

Furthermore, as another variation, it is possible to identify a specific person on the basis of records of communication and calls stored in association with the "contact information list" or the "address book". As an identification method, it is conceivable to identify, as a specific person, a person who often communicates or makes and receives calls, a person whose amount of communication is large, or a person whose duration of calls is long, for example.

Furthermore, as yet another variation, information in a social networking service (SNS) may be used; a person who often communicates through the SNS, a person whose duration of communication through the SNS is long, or a person who often accesses the SNS may be identified as a specific person. In this case, the photographic image extraction unit 150 extracts a photographic image by using a profile photograph registered in the SNS.

Variation 2

Figure 9:
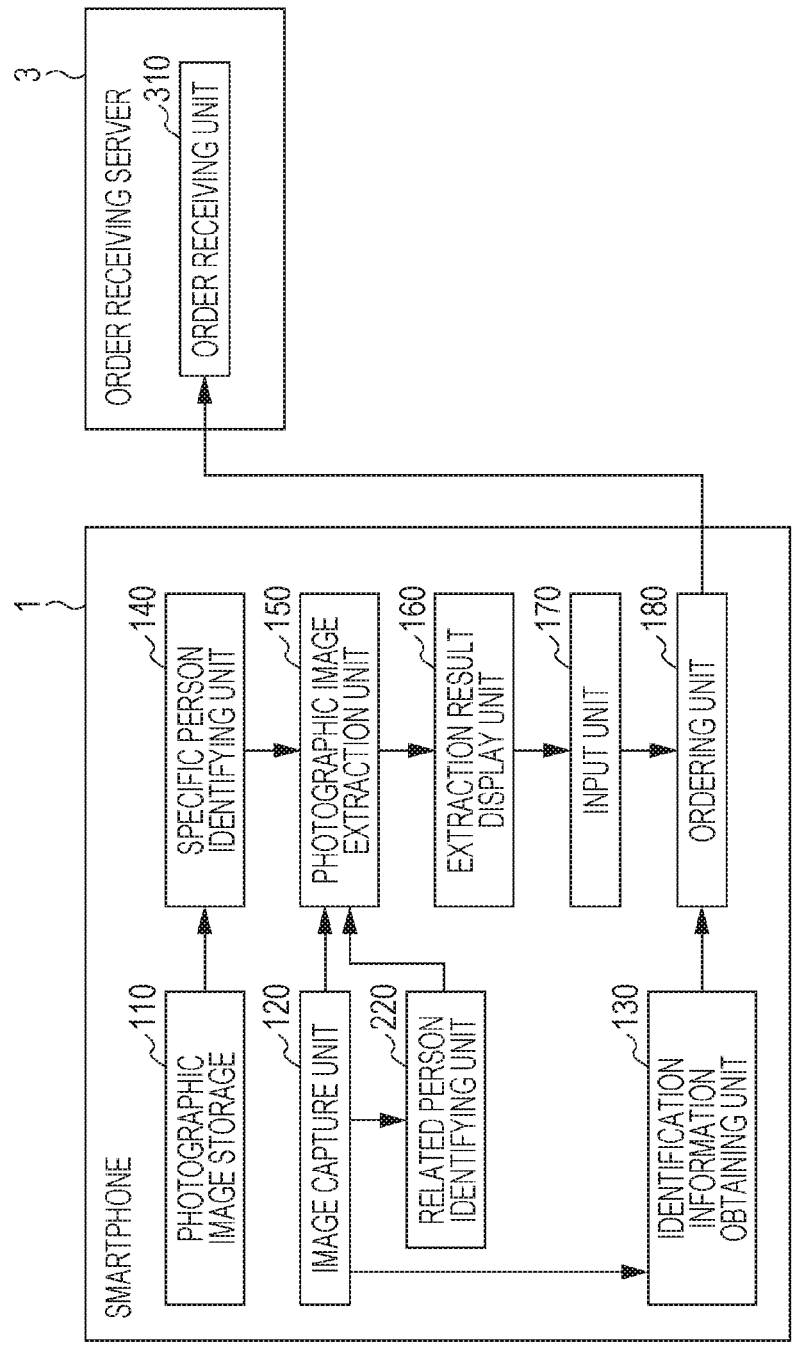
FIG. 9 is a functional block diagram of a smartphone according to Variation 2.

FIG. 9 is a functional block diagram of the smartphone 1 according to Variation 2. The smartphone 1 according to the present variation includes a related person identifying unit 220 in addition to the function elements according to the foregoing embodiment (see FIG. 5). The related person identifying unit 220 analyzes photographic images captured by the image capture unit 120 and identifies a related person whose image is present in a photograph containing an image of the specific person. As an identification method, it is conceivable to identify, as a related person, a person whose image is present in at least a predetermined number of photographs containing an image of a specific person or several popular people whose images are present in a large number of photographs containing an image of a specific person, for example. The photographic image extraction unit 150 according to the present variation extracts a photographic image having a high likelihood of containing an image of at least one of the specific person and the related person. Furthermore, the extraction result display unit 160 according to the present variation displays the specific person and the related person to be distinguishable.

Figure 10:
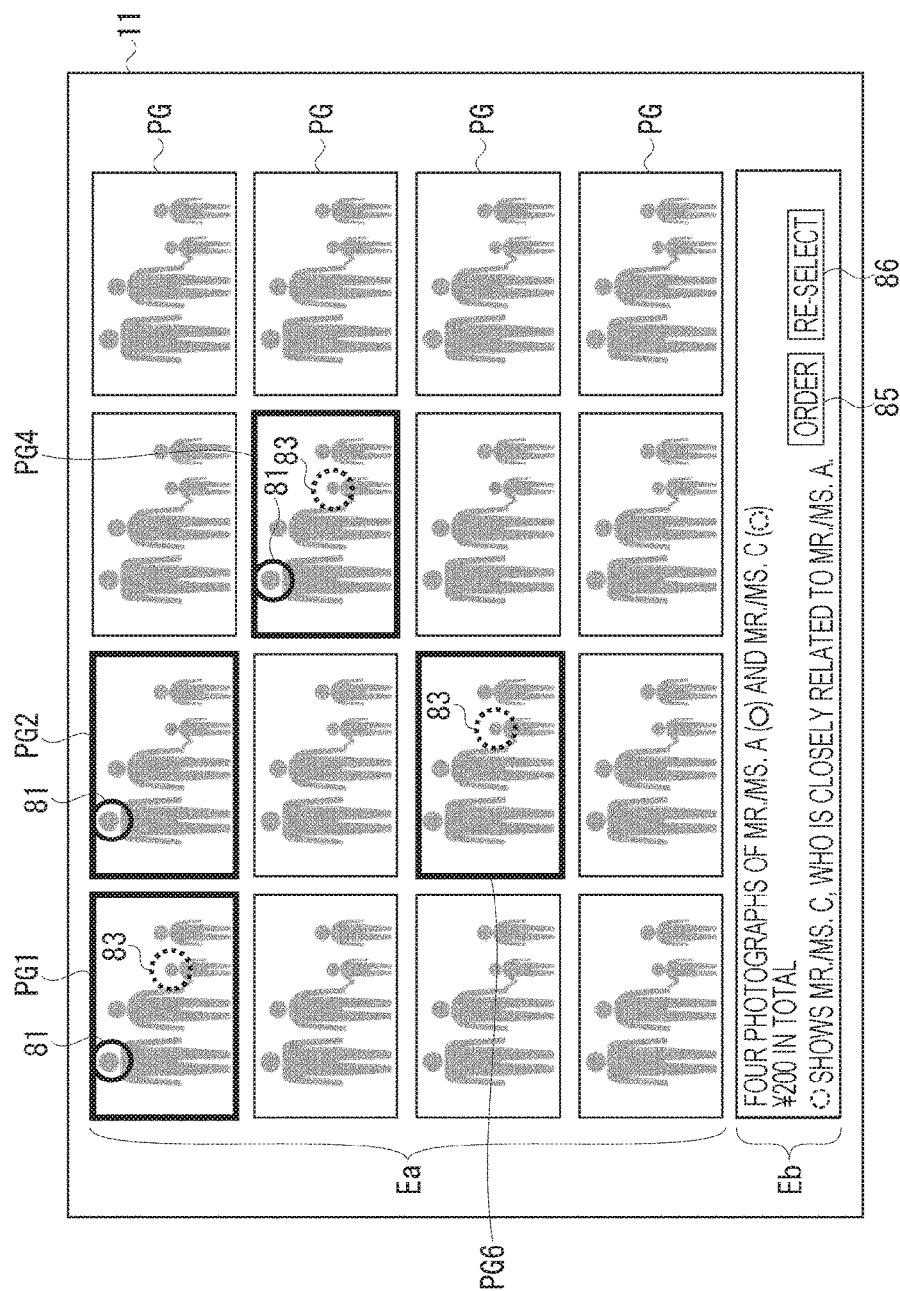
FIG. 10 illustrates an example of the result of photographic image extraction being displayed according to Variation 2.

FIG. 10 illustrates an example of the result of photographic image extraction being displayed according to the present variation. In FIG. 10, 81 and 83 denote an emphasis mark for a specific person "A" and an emphasis mark for a related person "C", respectively. In this way, in the photographic image display region Ea, the emphasis mark for a specific person and the emphasis mark for a related person are displayed in different display styles. Among the captured photographic images of the plurality of photographs, photographic images PG1, PG2, PG4, and PG6 containing an image of at least one of the specific person and the related person (a photographic image including the emphasis mark denoted by 81 or 83) are displayed in such a way to stand out more than the other photographic images. According to the present variation, the subject to be extracted from the photographic images can be not only the specific person, but also the related person whose image is present in a photograph containing an image of the specific person (such as a person who a user became acquainted with at an event, the photographs of which are posted). Furthermore, since the specific person and the related person are displayed to be distinguishable, a user can check, for example, which person is identified as the related person and whether the result of identifying the specific person and the related person is correct.

Note that in the case where two or more persons are identified as the related person, it is preferable that each of the persons be displayed to be distinguishable. As yet another variation, the subject to be displayed in an emphasis mode may be only the photographic image containing an image of the specific person or only the photographic image containing an image of the related person.

Variation 3

Although the identification information obtaining unit 130 according to the foregoing embodiment obtains the identification information with reference to the lookup table, a digital watermark may be embedded in a photograph, and the identification information may be obtained by reading the digital watermark. In the present variation, the identification information in the form of a digital watermark is embedded in every photograph posted in the posting area 60. Code images, such as two-dimensional codes or bar codes, characters, symbols, or the like are used as the identification information. The identification information obtaining unit 130 according to the present variation reads the digital watermark when the image capture unit 120 captures an image, and obtains the identification information of each photograph (each photographic image) from the digital watermark. With this configuration, a user can obtain photographic images and identification information simultaneously by only capturing images of photographs. Furthermore, since the identification information is embedded in a photograph as a digital watermark, a photographic image and identification information can easily be matched with each other.

As yet another variation, the identification information may be printed on the photograph in a visible manner. Furthermore, a label or the like indicating the identification information may be provided around the photograph, or the identification information (the order number) may be handwritten around the photograph. It is possible to obtain the identification information when the image capture unit 120 captures an image in this variation as well.

Variation 4

Furthermore, although the specific person identifying unit 140 according to the foregoing embodiment identifies a specific person with reference to the photographic image storage 110, a specific person may be identified in accordance with input from a user. For example, a plurality of photographic images of photographs captured by the image capture unit 120 may be displayed on the touch panel 11, and when a user arbitrarily selects a photographic image among the plurality of photographic images, one or more persons whose image or images are present in the arbitrarily selected photographic image may be identified as a specific person. Alternatively, when a person whose image is present in an arbitrarily selected photographic image is arbitrarily selected, the arbitrarily selected person may be identified as a specific person. Furthermore, in this case, the photographic image extraction unit 150 may search other photographic images for a specific person in consideration of the clothes of one or more persons or the arbitrarily selected person whose image is present in the arbitrarily selected photographic image. Consequently, among the photographic images captured at an event on the same day, a person participating in the event is likely to wear the same clothes, and thus a specific person can be extracted in accordance with features of the clothes even if the outcome of facial recognition is insufficient due to the orientation of the face of a person whose image is present in a photograph. In this case, the extraction result display unit 160 displays, as a result of the extraction, the arbitrarily selected photographic image and a photographic image among other photographic images that has a high likelihood of containing an image of a specific person.

Variation 5

Furthermore, although the image capture unit 120 captures images of the photographs posted in the posting area 60 in the foregoing embodiment, the target to be captured may be photographs arranged on a table, photographs attached to a photo album, or photographs displayed on a large monitor. Moreover, photographs in a bundle may be fed one by one so that an image of each of the photographs is captured.

Variation 6

Furthermore, although the photographic image extraction apparatus according to the invention is implemented as a single smartphone 1 in the foregoing embodiment, the photographic image extraction apparatus may be implemented as two smartphones 1. Specifically, the photographic image extraction apparatus may include a first apparatus having the image capture unit 120 and a second apparatus having the other elements and may be configured so that the second apparatus obtains photographic images captured by the first apparatus, extracts a photographic image, and displays the result of the extraction.

Variation 7

Furthermore, although the posting area code and the lookup table are obtained by reading the two-dimensional code C from the label 65 attached to the posting area 60 in the foregoing embodiment, these data can be obtained by another method such as by accessing the order receiving server 3 and obtaining the data from the order receiving server 3. Note that the posting area code does not need to be obtained if photographs in each posting area can be assigned different identification information. The lookup table does not need to be obtained either if photographs are attached in a predetermined order (if the smartphone 1 is capable of identifying identification information from the position of an attached photograph).

Variation 8

Furthermore, although the image capture unit 120 captures video in the foregoing embodiment, the image capture unit 120 may capture a still image. In this case, images of a plurality of photographs may be captured in one still image.

Variation 9

Furthermore, the extraction result display unit 160 may display only one or more photographic images extracted by the photographic image extraction unit 150 instead of displaying the plurality of photographic images captured by the image capture unit 120. It is also possible to capture a plurality of photographic images by using the image capture unit 120 and then display the plurality of photographic images, and extract one or more photographic images by using the photographic image extraction unit 150 and then display the result of the extraction illustrated in FIG. 7 or the one or more photographic images.

Other Variations

Furthermore, the structural elements of the smartphone 1 described above may be provided as a program. Various recording media in which the program is stored, such as a compact disc read-only memory (CD-ROM) and a flash memory, may also be provided. Specifically, the scope of the claims for the invention includes a program (including the dedicated application 21) for causing a computer to function as the structural elements of the smartphone 1 and a recording medium having the program recorded thereon. Note that the program for causing the computer to function as the structural elements of the smartphone 1 may be obtained via a network or the like by the smartphone 1 using, as a key, the two-dimensional code C on the label 65 posted in the posting area 60.

Furthermore, although the photographic image extraction apparatus according to the invention is implemented as the smartphone 1 in the foregoing embodiment, the photographic image extraction apparatus may be implemented as another information processing device or image capture apparatus having an image capture function, such as a tablet device, a cell phone, a laptop personal computer (PC), a digital camera, or a video camera. Moreover, the input unit 170 and the ordering unit 180 may be omitted; it is possible to use a method in which a user fills out an order number on an order envelope or the like to place an order. Other changes that do not depart from the essence of the invention can be made where necessary.

This application claims priority under 35 U.S.C. § 119 to Japanese Patent Application No. 2015-216382, filed Nov. 4, 2015. The entire disclosure of Japanese Patent Application No. 2015-216382 is hereby incorporated herein by reference.

What is claimed is:

1. A photographic image extraction apparatus, comprising:
   an image capture unit that captures an image of a plurality of photographs;
   a photographic image extraction unit that (1) analyzes the image to identify each of the photographs that are included in the plurality of photographs and (2) clips, from the image, each of the identified photographs, wherein at least some of the clipped photographs are then displayed simultaneously with each other on a user interface, and wherein one or more of the clipped photographs are identified as having a high likelihood of containing an image of a specific person;
   an extraction result display unit that causes the user interface to be displayed;
   a personal information storage that stores a portrait in association with personal information; and
   a specific person identifying unit that identifies the specific person based on the personal information stored in the personal information storage, wherein the photographic image extraction unit clips the identified photographs by using the portrait of the identified specific person.

2. The photographic image extraction apparatus according to claim 1, further comprising:
   an identification information obtaining unit that obtains identification information for uniquely identifying each of the clipped photographs;
   an input unit that selects a particular clipped photograph that is to be ordered; and
   an ordering unit that orders a photograph that corresponds to the selected clipped photograph, wherein the ordering unit orders the photograph using the identification information.

3. The photographic image extraction apparatus according to claim 2, wherein the identification information obtaining unit obtains the identification information by referencing a lookup table that records position information for each of the plurality of photographs.

4. The photographic image extraction apparatus according to claim 2, wherein a digital watermark is embedded in each of the plurality of photographs, and wherein the identification information obtaining unit obtains the identification information from the digital watermark when the image capture unit captures the image.

5. The photographic image extraction apparatus according to claim 1, wherein the image capture unit captures a video such that the image is a part of the video, and wherein the photographic image extraction unit clips each of the identified photographs from the image that is the part of the video.

6. The photographic image extraction apparatus according to claim 1, wherein the one or more clipped photographs that are identified as having the high likelihood of containing the image of the specific person are rendered in a first format while all remaining clipped photographs that are displayed on the user interface are rendered in a second format, the first format being different than the second format.

7. The photographic image extraction apparatus according to claim 1, wherein the extraction result display unit displays the specific person in such a way to stand out more than other persons whose images are present in the displayed clipped photographs.

8. The photographic image extraction apparatus according to claim 1, further comprising:
   photographic image storage that stores photographic images captured in the past; and
   a specific person identifying unit that identifies, as the specific person, a person whose image is present in a selected number of the photographic images that were captured in the past.

9. The photographic image extraction apparatus according to claim 1, further comprising
   a related person identifying unit that analyzes the clipped photographs and that identifies a related person whose image is also present in a photograph containing an image of the specific person, wherein the photographic image extraction unit identifies a particular clipped photograph that has a high likelihood of containing an image of at least one of the specific person and the related person.

10. The photographic image extraction apparatus according to claim 9, wherein the extraction result display unit displays the specific person and the related person to be distinguishable.

11. A photographic image extraction method performed by a computer, the method comprising:
    capturing an image of a plurality of photographs;
    analyzing the image to identify each of the photographs that are included in the plurality of photographs;
    digitally clipping, from within the image, each of the identified photographs;
    determining that one or more of the clipped photographs have a high likelihood of containing an image of a specific person;
    displaying at least some of the clipped photographs simultaneously with each other on a user interface;
    storing a portrait in association with personal information; and
    identifying the specific person based on the stored personal information, wherein the identified photographs are digitally clipped by using the portrait of the identified specific person.

12. A computer system comprising:
    one or more processors; and
    one or more computer-readable hardware storage devices having stored thereon computer-executable instructions, the computer-executable instructions being executable by the one or more processors to cause the computer system to:
    record an overall image within which a compilation of other images are visualized in the overall image;
    analyze the overall image to identify each of the other images;
    after identifying each of the other images that are visualized in the overall image, digitally clip each of the other images from the overall image, wherein digitally clipping the other images includes correcting distortions of the clipped images;
    identify one or more clipped images that each visualize a particular person;
    display at least some of the clipped images on a user interface, wherein the displayed images are displayed simultaneously with each other, and wherein the displayed images at least include the one or more clipped images that visualize the particular person;
    store a portrait of the particular person in association with personal information; and identify the particular person based on the stored personal information, wherein the clipped images are digitally clipped by using the portrait of the identified particular person.

* * * * *